United States Patent
Luchsinger et al.

(10) Patent No.: US 10,648,455 B2
(45) Date of Patent: May 12, 2020

(54) FLYING APPARATUS

(71) Applicants: TwingTec AG, Dübendorf (CH);
EMPA Eidg. Materialprüfungs- und Forschungsanstalt, Dübendorf (CH)

(72) Inventors: Rolf Luchsinger, Seegraben (CH); Flavio Gohl, Hinwil (CH)

(73) Assignees: TwingTec AG, Dübendorf (CH); EMPA Eidg. Materialprüfungs- und Forschungsanstalt, Dübendorf (CH)

( * ) Notice: Subject to any disclaimer, the term of this patent is extended or adjusted under 35 U.S.C. 154(b) by 371 days.

(21) Appl. No.: 15/519,259

(22) PCT Filed: Oct. 13, 2015

(86) PCT No.: PCT/EP2015/073656
§ 371 (c)(1),
(2) Date: Apr. 14, 2017

(87) PCT Pub. No.: WO2016/059040
PCT Pub. Date: Apr. 21, 2016

(65) Prior Publication Data
US 2017/0248125 A1      Aug. 31, 2017

(30) Foreign Application Priority Data
Oct. 14, 2014   (EP) ..................... 14188720

(51) Int. Cl.
*F03D 9/32*     (2016.01)
*B64C 29/00*    (2006.01)
(Continued)

(52) U.S. Cl.
CPC ............ *F03D 9/32* (2016.05); *B64C 29/0033* (2013.01); *B64C 39/022* (2013.01);
(Continued)

(58) Field of Classification Search
CPC ...... F03D 9/32; B64C 29/0033; B64C 29/022
See application file for complete search history.

(56) References Cited

U.S. PATENT DOCUMENTS 1,783,458 A * 12/1930 Windsor ............. B64C 29/0033
244/6
2003/0091437 A1    5/2003  Roberts
(Continued)

FOREIGN PATENT DOCUMENTS

GB          866608 A      4/1961
WO      2010/137016 A2   12/2010
(Continued)

OTHER PUBLICATIONS

International Search Report for PCT/EP2015/073656 dated Nov. 3, 2015 [PCT/ISA/210].
(Continued)

*Primary Examiner* — Philip J Bonzell
*Assistant Examiner* — Tye William Abell
(74) *Attorney, Agent, or Firm* — Sughrue Mion, PLLC

(57) ABSTRACT

A flying apparatus is provided that comprises a airfoil (1) with a streamlined profile for generating an aerodynamic lift force vector (L) acting on the flying apparatus when being exposed to an apparent air flow. The flying apparatus also comprises at least three drive units (4, 42; 5, 51; 6, 61) being adapted to generate a resulting thrust force vector acting on the flying apparatus, the thrust force vector being alignable essentially in parallel with the aerodynamic lift force vector (L). For controlling the aerodynamic pitch of the flying apparatus, the flying apparatus comprises at least one control surface (31, 11). Furthermore, the flying apparatus has an aerodynamic neutral point (NP) that lies, along the longitudinal centre axis (10) and in the direction from the leading
(Continued)

edge (17) to the trailing edge (18) of the airfoil (1), behind the centre of gravity (CG) of the flying apparatus.

17 Claims, 6 Drawing Sheets

(51) Int. Cl.
*B64C 39/02* (2006.01)
*B64F 3/02* (2006.01)
*F03D 5/00* (2006.01)

(52) U.S. Cl.
CPC .............. *B64C 39/024* (2013.01); *B64F 3/02* (2013.01); *B64C 2201/021* (2013.01); *F03D 5/00* (2013.01)

(56) References Cited

U.S. PATENT DOCUMENTS

| | | |
|---|---|---|
| 2005/0017515 A1 | 1/2005 | Roberts et al. |
| 2005/0067839 A1 | 3/2005 | Roberts et al. |
| 2007/0057113 A1* | 3/2007 | Parks .................. B64C 15/00 244/12.5 |
| 2007/0176432 A1* | 8/2007 | Rolt .................. B64C 39/022 290/55 |
| 2010/0032947 A1 | 2/2010 | Bevirt |
| 2011/0057453 A1* | 3/2011 | Roberts .................. F03D 1/02 290/55 |
| 2011/0260462 A1* | 10/2011 | Vander Lind ........ A63H 27/002 290/55 |
| 2012/0091257 A1* | 4/2012 | Wolff .................. B64C 29/0033 244/12.4 |

FOREIGN PATENT DOCUMENTS

| | | |
|---|---|---|
| WO | 2013/124699 A1 | 8/2013 |
| WO | WO-2013124699 A1 * | 8/2013 |
| WO | 2015/032652 A2 | 3/2015 |

OTHER PUBLICATIONS

Written Opinion for PCT/EP2015/073656 dated Nov. 3, 2015 [PCT/ISA/237].

Clancy L. J., Aerodynamics, Chapter 16, Aircraft Stability and Control, pp. 474-563 (46 pages total), 1975, Pitman Publishing Limited, London, ISBN 0-273-01120-0.

* cited by examiner

FLYING APPARATUS

CROSS REFERENCE TO RELATED APPLICATIONS

This application is a National Stage of International Application No. PCT/EP2015/073656 filed Oct. 13, 2015, claiming priority based on European Patent Application No. 14188720.8 filed Oct. 14, 2014, the contents of all of which are incorporated herein by reference in their entirety.

TECHNICAL FIELD

The present invention concerns a flying apparatus, in particular a flying apparatus for generating electrical energy.

PRIOR ART

Launching and landing are typically the most difficult maneuvers for an airplane. In order to maintain a minimal lift force to counterbalance the weight, the speed of the airplane should not drop below some threshold value. As a consequence, long runways are needed.

In documents WO 03/029075 A2 and WO 2010/137016 A2, it is proposed to provide propellers that are able to generate a vertically oriented thrust, in order to enable vertical launching and landing as well as hovering of the airplane. The problem with these airplanes, however, is that the flight can get unstable with fast changing winds. Furthermore, structural elements with considerable complexity are needed to connect the propellers with the airplane.

The situation is even more complex when flying apparatuses, such as kites, are considered that are connected to the ground by means of tethers. Such tethered flying apparatuses are currently investigated to harness wind energy. The technology is generally referred to as kitepower.

It has been proposed to convert wind energy into electrical energy by utilizing the aerodynamic forces of a kite on the tether, in order to drive a generator located in a ground station. Thus, in a power phase, when the kite is lifted due to the wind pressure, a generator winch is driven by the tethers. As soon as the tethers are extended to a certain limit, the kite is retracted by pulling in the tether by means of a motor. In doing so, the flight path of the kite and the aerodynamic forces on the kite in the retraction phase are chosen such that the force in the tethers is reduced. Once the minimal tether length is reached, the power phase can be started again. Said cycle is repeated while the wind allows this. The kite is flown and controlled such that the average power over a cycle is maximised.

A system of a flying apparatus that drives a generator on the ground by means of its aerodynamic forces pulling on the tethers is disclosed for example in the unpublished PCT application No. PCT/EP 2014/068067.

Another possibility to harness wind energy is to mount electrical generators directly on the flying apparatus and to transmit the produced electrical energy to the ground by means of electrically conducting tethers. The electrical generators are in this case driven by respective propellers attached to the flying apparatus.

A flying apparatus with a plane-like configuration and with generators being attached to the airfoil is shown in US 2011/0260462 A1. The same propellers which are used for power production are also used for generating a vertical thrust during launching and landing of the flying apparatus. For this purpose, the plane-like flying apparatus is rotated from a forward flight position in a vertical hover position during the launching and landing phases, during which the tail points towards the ground. A limitation of this method is that the wind interferes with the flying apparatus in a destructive way in this hover position. The airfoil of the main wing is about perpendicular to the wind and does not create any lift. In fact the main wing is with respect to the wind in a stalled position which makes the flying apparatus difficult to stabilize. Furthermore, the transitions from forward flight mode into the vertical hover mode and vice versa are rather delicate manoeuvers which are not easy to accomplish.

In order to efficiently produce energy, the tethered flying apparatuses preferably fly crosswind, for example in a figure of eight, which allows them to fly way faster than the wind speed. To this end, the wings must have the high aerodynamic efficiency of a plane-like configuration. On the other hand, due to the constraints of the tethers, conventional launching and landing procedures of an airplane with a runway cannot be applied. Safe and efficient as well as fully autonomous launching and landing of the flying apparatus from and to a defined location is one of the main challenges to make kitepower technology economically available.

Tethered airborne wind-driven power generators with vertical launching and landing capabilities have been described in US 2003/0091437 A1, US 2005/0017515 A1, US 2005/0067839 A1 and US 2011/0057453 A1 using a tethered quadrocopter configuration. During launching and landing, power is supplied through the conducting tether while rotors are used to produce lift. During power production, the rotors are used as wind turbines delivering power through the tether to the ground. While vertical launching and landing can easily be achieved with this concept, the power production is not efficient. The rotors need to be inclined by a large angle with respect to the wind direction in order to produce enough lift to keep the system airborne. This considerably reduces the amount of electrical power production. Further, the system cannot operate in a crosswind mode which again limits the efficiency very much.

WO 2013/124699 A1 discloses a wind power generating device, in which main rotor units are provided that can be adjusted perpendicular to the wind direction in power production mode. The electrical power is produced by the main rotor units and transmitted through the conducting tether to the ground. However, the device cannot operate in a forward flight mode and thus cannot operate in a crosswind mode. Thus, it is not very efficient. Furthermore, the device has a rather complex construction with a lot of adjustable and rotating parts resulting in high costs and reduced life time.

SUMMARY OF THE INVENTION

It is an object of the present invention to provide a flying apparatus which is able to launch and land in a stable and well controllable way even in bad wind conditions and without the need of a runway.

The present invention provides a flying apparatus with a longitudinal centre axis, comprising
  a particularly stiff airfoil extending essentially perpendicularly to the longitudinal centre axis along a span direction, comprising a streamlined profile with a leading edge and a trailing edge for generating an aerodynamic lift force vector acting on the flying apparatus when being exposed to an apparent air flow in the direction from the leading edge to the trailing edge;
  at least three drive units, in particular propellers, being adapted to together generate a resulting thrust force vector acting on the flying apparatus, the thrust force vector being alignable essentially in parallel with the aerodynamic lift force vector particularly during launching and landing phases; and at least one control surface, such as an elevator, for controlling the aerodynamic pitch of the flying apparatus.

The flying apparatus has an aerodynamic neutral point that lies, along the longitudinal centre axis and in the direction from the leading edge to the trailing edge, behind the centre of gravity of the flying apparatus.

By aligning the thrust force vector generated by the drive units essentially in parallel with the aerodynamic lift force vector, i.e. usually in a vertical direction parallel to the gravitational direction, during the launching and landing phases, the flying apparatus is able to hover over ground independently of the presence of an apparent wind. Thus, the flying apparatus is able to vertically take off and land without the need of a runway. In the process of the launching phase, when the apparent wind usually increases, the vertical thrust generated by the drive units can continuously be reduced and turned off, as soon as the lift force generated by the airfoil profile is sufficient to counteract the weight of the flying apparatus. Thus, continuous transitions from the launching phase to the normal forward flight phase and from the normal forward flight phase to the landing phase are possible without having to carry out any special manoeuvres. During the entire launching and landing phases, the flying apparatus can be in the same position with respect to the inflowing wind as during the normal forward flight phase.

By having an elevator for controlling the aerodynamic pitch of the flying apparatus during the normal forward flight phase, but also during the launching and landing phases, when there is at least some apparent wind, the angle of attack of the airfoil with respect to the wind direction can be adjusted and thus the lift of the flying apparatus be controlled. Further control of the flying apparatus in forward flight can be obtained by additional control surfaces such as ailerons and/or a fin.

The neutral point or aerodynamic centre is a term well known to the person skilled in the art and refers to the position at which the pitching moment coefficient for the airfoil does not vary with the lift coefficient. By designing the flying apparatus such, that its aerodynamic neutral point is arranged behind the centre of gravity, a particularly stable flight attitude can be achieved.

The flying apparatus preferably has a plane-like design with a fuselage to which the airfoil forming the main wing is attached. The fuselage usually has an elongated design defining the longitudinal centre axis of the flying apparatus. Preferably, the flying apparatus, which advantageously is adapted for carrying out unmanned flights, has an axially symmetrical configuration particularly with respect to the arrangement of the drive units.

A major advantage of the flying apparatus as indicated is that it can easily be designed with an airfoil having an aspect ratio of at least 4:1, in particular 8:1. Such a high aspect ratio is important to obtain a high lift to drag ratio of the flying apparatus, which means efficient forward flying with minimal power consumption.

Usually, each of the drive units comprises a propeller each and preferably also a motor, in particular an electric motor, to drive the propeller. The rotation axis of the propellers is preferably oriented essentially normal to the plane of the airfoil, i.e. the rotation axis of the propellers is preferably aligned essentially perpendicular to the plane spanned by the longitudinal centre axis and the span direction of the airfoil.

For optimal power transmission, the rotation axis of each motor corresponds to the rotation axis of the respective rotation axis of the propeller to which it is coupled. One or several batteries can be provided on the flying apparatus for power supply of the motors. Preferably, the drive units are dimensioned equally with respect to their thrust generated.

In order to achieve stable flight characteristics, the drive units are advantageously arranged such that the centre of the total thrust generated by the drive units is essentially at the centre of gravity of the flying apparatus. Along the longitudinal centre axis, the centre of gravity can for example be located in the region of the airfoil, particularly in the region between the leading edge and one half of the chord length of the airfoil. Preferably, at least one drive unit is arranged, with respect to the normal wind inflow direction, i.e. the direction from the leading edge to the trailing edge along the longitudinal centre axis, in front of the airfoil and in particular on the longitudinal centre axis of the flying apparatus. With such an arrangement, the centre of thrust of the drive units can easily be located at the desired position near or at the centre of gravity with only a small number of drive units. Due to weight considerations, the flying apparatus preferably only has three drive units.

In order to reduce the torque acting on the flying apparatus, the drive units can be adapted to rotate in opposite directions and can in this case advantageously be dimensioned and arranged such, that they mutually compensate their respective torques. An even number of drive units can be provided for this purpose. However, it is also possible for the flying apparatus to hover, if all propellers are adapted to spin in the same direction.

Advantageously, at least two drive units are integrated in the airfoil. The propellers of these drive units are preferably radially surrounded by the airfoil. By integrating the drive units in the airfoil, a minimal aerodynamic influence of the drive units can be achieved when being in their idle state, i.e. deactivated.

Preferably, in order to minimize the control energy and to achieve an even more stable flight attitude during the launching and landing phases, a drive unit is arranged in the region of each wing tip of the airfoil. To minimize the influence of these drive units on the flight characteristics of the flying apparatus during the normal forward flight mode, the drive units arranged in the regions of the wing tips can preferably be stowed inside of the airfoil. Advantageously, the drive units are retractable into the interior of the airfoil.

Since the centre of gravity of the flying apparatus usually is in the region of or slightly behind the leading edge of the airfoil along the longitudinal centre axis, one or more drive units are preferably arranged in the region of the trailing edge of the airfoil. By additionally arranging at least one further drive unit in front of the airfoil, the centre of thrust of all drive units can be adjusted such with this arrangement, that it comes to lie in the region of the centre of gravity of the flying apparatus.

The flight attitude of the flying apparatus during launching and landing can for example be controlled by differential thrusts generated by the drive units. The control of the flying apparatus, however, is easier, if at least one drive unit is tiltable about a rotation axis extending through the drive unit, in particular through the drive unit's propeller, and the centre of gravity. Preferably, at least one drive unit is tiltable about a rotation axis extending essentially in parallel to the longitudinal centre axis, in order to stabilize the flying apparatus during launching and landing.

In certain embodiments, at least one drive unit, preferably a front propeller, can alternatively or additionally be tiltable about a rotation axis extending essentially in parallel to the span direction of the airfoil, in order to change the thrust force vector of this respective drive unit from a vertical to a horizontal direction along the longitudinal centre axis of the flying apparatus. The drive unit can in this case be used for generating a forward thrust during the normal forward flight phase.

The flying apparatus can be used e.g. as a drone or as an unmanned aerial vehicle (UAV) to transport goods, such as e.g. medicine to remote places. It is also possible to use the flying apparatus in the form of a geostationary elevated platform, for example as a flying antenna used for telecommunication. In a particularly preferred embodiment, however, the flying apparatus is adapted to generate electrical energy and comprises at least one pivot point for the connection of a tether, in order to connect the flying apparatus to a ground station. For generating the electrical energy, the drive units can be used as generators. Preferred, however, is the application of the flying apparatus in a kitepower system, in which the aerodynamic lift of the flying apparatus creates large tension forces on one or several tethers, which is used to generate electrical energy in a ground based generator in a cyclic process.

With a tethered flying apparatus being configured as indicated above, launching and landing can be carried out fully autonomously in a power plant in which wind power is converted into electrical energy. Precision landing under all wind and weather conditions is possible with the help of the vertical thrust generated by the drive units. During launching and landing, the tethers also help to control the position of the flying apparatus. In particular for landing, the flying apparatus can be guided with the tethers into its parking position e.g. on a rig.

Preferably, at least two pivot points are provided, each of these pivot points serving for the connection of a tether. These pivot points are advantageously arranged such, that the flying apparatus can be rolled during tethered flight by means of differential operation of the tethers, in order to manoeuvre the flying apparatus through a turning flight.

In order to obtain favourable flight characteristics and a good distribution of the forces acting on the airfoil, the pivot points are advantageously arranged symmetrically with respect to the longitudinal centre axis of the flying object and preferably essentially at the centre of gravity along the longitudinal direction, in particular at a distance from the leading edge of about one quarter of the chord length of the airfoil towards the trailing edge.

In a preferred embodiment, the flying apparatus is adapted for flying crosswind, which allows achieving speeds of the flying apparatus being higher than the wind speed.

In order to reduce the aerodynamic drag acting on the flying apparatus during the forward flight phase, at least one drive unit can comprise a propeller with blades that are, in the idle state of the propeller, foldable into a streamlined position.

In order to reduce the aerodynamic lift of the flying apparatus and to increase the aerodynamic drag, the flying apparatus can additionally comprise an air brake. Preferably, the air brake is integrated into the airfoil. Usually, the air brake can be activated, i.e. moved into a position in which the air brake is exposed to the apparent wind, and deactivated, i.e. moved into a position in which the air brake has no or only marginal effects on the aerodynamics of the flying apparatus. The activation and deactivation of the air brake is preferably effected by a drive unit, such as a servo, arranged on the flying apparatus. The drive unit is advantageously controllable from the ground station.

SHORT DESCRIPTION OF THE FIGURES

Preferred embodiments of the invention are described in the following with reference to the drawings, which only serve for illustration purposes, but have no limiting effects. In the drawings it is shown:

DESCRIPTION OF PREFERRED EMBODIMENTS

Figure 10:
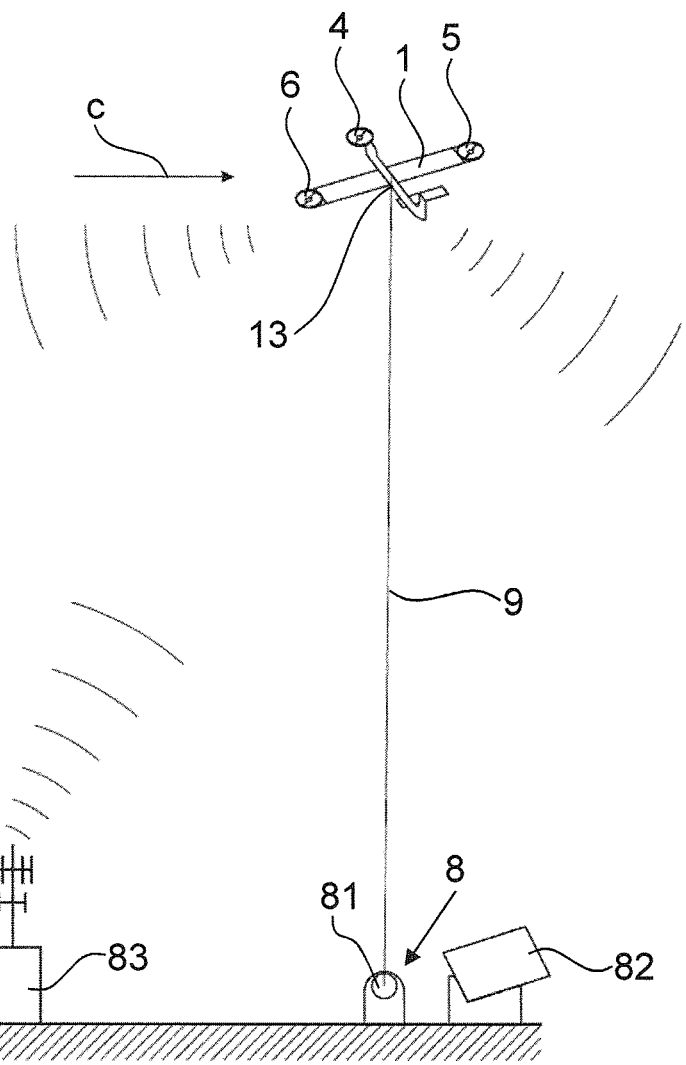
FIG. 10 shows a stationary elevated platform, comprising a flying apparatus according to the invention.

FIGS. 1 to 8 show several embodiments of flying apparatuses according to the invention. FIGS. 9a to 9c show, how a flying apparatus according to the invention can be used to harness wind energy in a system for generating electrical energy. FIG. 10 shows a further application of the flying apparatus according to the invention as a stationary elevated platform. To each of the embodiments as shown in FIGS. 1 to 8 one or several tethers can be attached, in order to use the respective flying apparatus for the generation of electrical energy or as a stationary elevated platform. Electrical energy and or communication signals can be transmitted from the ground to the flying apparatus or vice versa by means of the tether(s), which in this case is/are electrically conductive and/or comprise communication means, such as a fibre optical cable.

Elements having an identical or similar function are indicated by the same reference numerals throughout all embodiments as shown in FIGS. 1 to 10.

Figure 1:
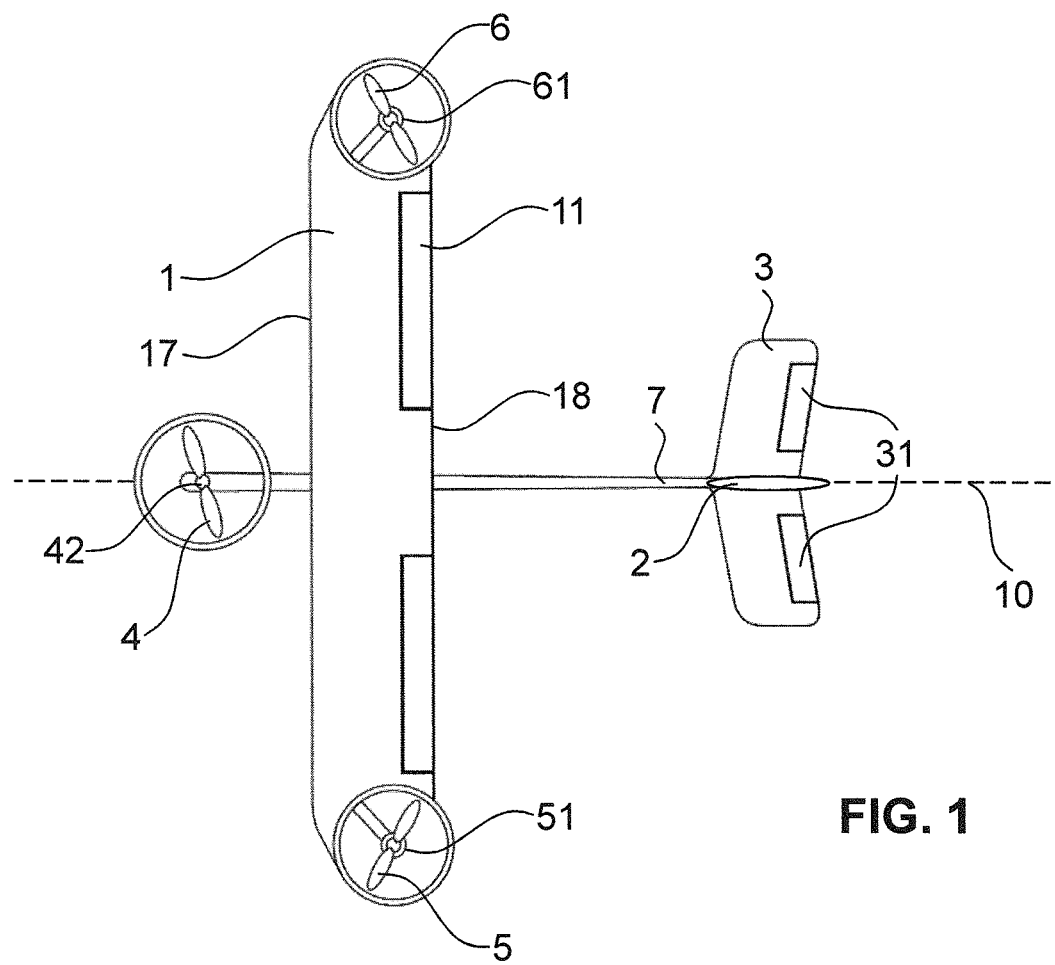
FIG. 1 shows a top view of a an inventive flying apparatus according to a first embodiment.
Figure 2:
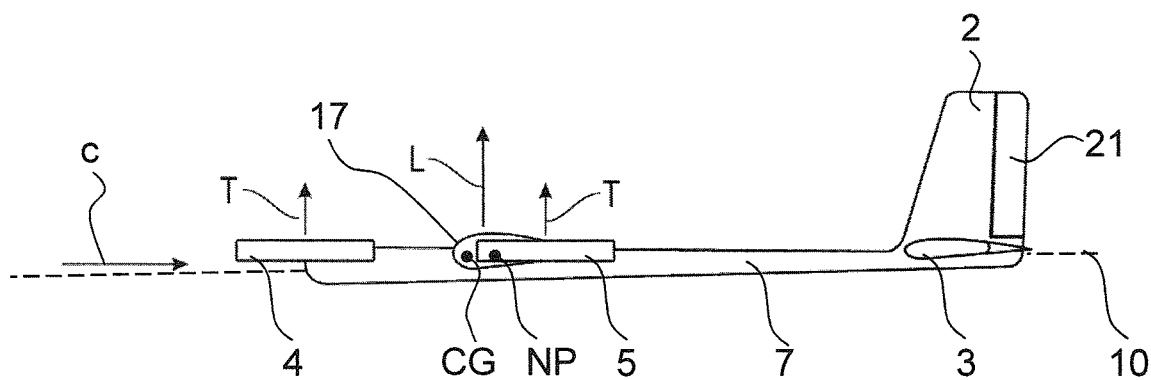
FIG. 2 shows a side view of the flying apparatus of FIG. 1.

The flying apparatus according to the first inventive embodiment as shown in FIGS. 1 and 2 has a plane-like structure with a fuselage 7 to which a main airfoil 1, a vertical stabilizer 2 and a horizontal stabilizer 3 are attached. The fuselage 7 has a slender, elongated outer shape which defines a longitudinal centre axis 10 of the flying apparatus. Depending on the payload and mission of the flying apparatus, the fuselage 7 can of course have a more voluminous shape. Different methods to build the structure of the flying apparatus are known to the expert. To keep the weight of the flying apparatus minimal, light-weight structures such as composites e.g. with glass fibres or carbon fibres can be applied. Tensairity® structures may be adopted, too.

The vertical stabilizer 2 has the form of a vertically extending fin being attached to the rear end of the fuselage 7. The horizontal stabilizer 3 is also attached to the rear end of the fuselage 7 and extends from the fuselage 7 horizontally and in parallel to the airfoil 1 in both lateral directions. In an alternative embodiment, the horizontal stabilizer 3 could also be attached e.g. to the upper end of vertical stabilizer 2. Thus, the vertical stabilizer 2 and the horizontal stabilizer 3 extend in essentially perpendicular directions.

The flying apparatus as shown in FIG. 1 also comprises control surfaces in the form of ailerons 11, a side rudder 21 and elevators 31. These control surfaces which are well known to the skilled person are used to steer and control the flying apparatus. The ailerons 11 are arranged at the trailing edge 18 of the airfoil 1 and are used to control movements of the flying apparatus about its longitudinal centre axis 10, i.e. roll movements. The side rudder 21, which serves to control yaw of the flying apparatus about the vertical axis, extends in the vertical direction and is attached to the trailing edge 18 of the vertical stabilizer 2. The elevators 31 are attached to the trailing edge 18 of the horizontal stabilizer 3 and allow controlling the pitch of the flying apparatus and thus the angle of attack and the lift of the flying apparatus. Thus, control over all three axes of the flying apparatus is provided by means of the control surfaces 11, 21 and 31 during forward flight without the need of any propellers.

The airfoil 1 is attached to the fuselage 7 in the front part region of the fuselage 7 and extends perpendicularly to the longitudinal centre axis 10. The airfoil 1 has a streamlined profile generating an aerodynamic vertical lift force vector L in an apparent airflow. Owing to the streamlined profile of the airfoil 1, the flying apparatus as shown in FIG. 1 can fly as a conventional airplane. The aerodynamic lift force is proportional to the square of the air velocity with respect to the airfoil 1. At high speeds the weight of the flying apparatus is counterbalanced by the aerodynamic lift force L of the airfoil 1. The lift force L can be adjusted to the given weight of the flying apparatus at different speeds by adapting the lift coefficient. This is accomplished mainly by changing the angle of attack of the airfoil 1 by means of elevators 31. However, there is a minimal speed at which the aerodynamic lift force L is no more sufficient to balance the weight even at the highest possible lift coefficients.

For speeds below this minimal speed, three propellers 4, 5 and 6 are provided, which are each driven by a motor 42, 51, 61 being provided on the flying apparatus. Together with its associated motor 42, 51, 61, each of the propellers 4, 5 and 6 represents a drive unit. The propellers 4, 5 and 6 can be activated. The thrust of the propellers generates an auxiliary lift force, in order to maintain the flying apparatus airborne also with little apparent wind flow. A front propeller 4 is attached to the front end of the fuselage 7. Side propellers 5 and 6 are integrated in the airfoil 1 in the region of each outer wing tip of the airfoil 1. Thus, the three propellers 4, 5 and 6 are distributed symmetrically with respect to the longitudinal centre axis 10 of the flying apparatus. The propellers 4, 5 and 6 are basically oriented in the plane of the airfoil 1, thus producing a vertical thrust force vector T that is essentially oriented normal to the airfoil 1 and to a large extent in the same direction as the aerodynamic lift force vector L of the airfoil 1. In the embodiment as shown in FIGS. 1 and 2, the propellers 4, 5 and 6 are directly attached to the plane-like structure of the flying apparatus essentially without any extra structural elements.

In order to achieve stable flight characteristics and a level hover position of the flying apparatus, the propellers 4, 5 and 6 are arranged such on the flying apparatus that the centre of the vertical thrust generated by these propellers 4, 5, 6 essentially coincides with the centre of gravity CG of the flying apparatus. Since in the current embodiment the centre of gravity CG is located along the longitudinal centre axis 10 in the region of the leading edge 17 of the airfoil 1, the side propellers 5 and 6 are arranged at a rear position of the airfoil 1, in the region of the trailing edge 18. It is a further constraint for the design of the flying apparatus that its centre of gravity CG needs to be in front of the aerodynamic neutral point NP of the flying apparatus along the longitudinal centre axis 10 with respect to the air inflow direction (arrow c). Sweep, dihedral or tapering of the airfoil 1 can help to fulfil these constraints when integrating the propellers 4, 5, 6 into the structure.

The lower the apparent airspeed is, the lower the aerodynamic lift force L is and thus a higher thrust T from the propellers 4, 5, 6 is needed to compensate the weight of the flying apparatus. At zero apparent airspeed, the weight is counterbalanced solely by thrust of the propellers 4, 5, 6 and the flying apparatus hovers.

In order to balance the flying apparatus e.g. due to unstable wind conditions, the propellers 4, 5 and 6 can be controlled such, that they generate a respective differential thrust.

Figure 3:
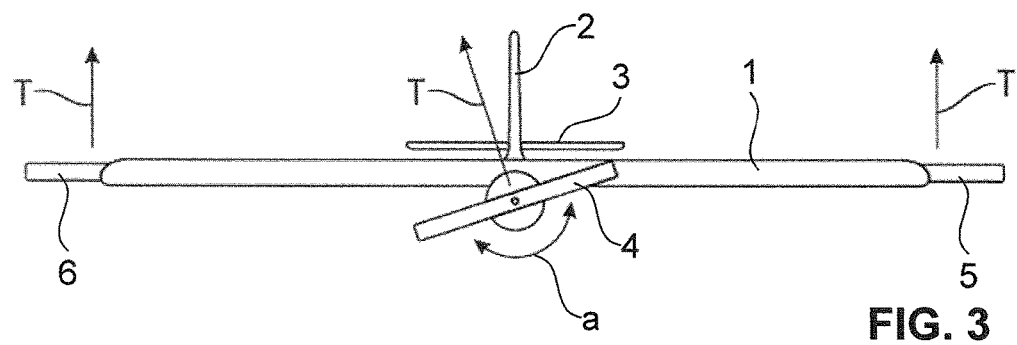
FIG. 3 shows a front view of an inventive flying apparatus according to a second embodiment.

The embodiment as shown in FIG. 3 differs from the embodiment of FIGS. 1 and 2 by the attachment of the front propeller 4 to the fuselage 7. In the embodiment of FIG. 3, the front propeller can be tilted with respect to the fuselage 7 about the longitudinal centre axis 10 (arrow a), in order to control a horizontal flight attitude of the flying apparatus during launching and landing and to balance the torque acting on the flying apparatus. Thus, the three propellers 4, 5, 6 can fully control the position of the flying apparatus over three axes without the help of the aerodynamic forces of the airfoil 1 and of the control surfaces 11, 21, 31. This is of particular importance during hovering when there is no airflow over the airfoil 1. In order to produce a roll movement, a differential thrust between the left and the right side propellers 5, 6 on the airfoil 1 needs to be applied. Pitch can be controlled by a differential thrust between the front propeller 4 and the two side propellers 5, 6. Yaw can be controlled by tilting the front propeller 4 about the longitudinal centre axis 10. When the front propeller 4 is tilted, its thrust T needs to be slightly increased, in order not to alter the resulting total thrust in the vertical direction. Autonomous control strategies can be employed to balance the thrust levels of the propellers 4, 5, 6. Fixed propeller blades such as are typically employed in quadrocopters can be used for minimizing the cost and the complexity of the flying apparatus. The complex design of adjustable propeller blades by means of a swash plate as used in helicopters is not needed. Instead of the front propeller 4 also one of the side propellers 5 or 6 might be tilted to produce the same effect. The same effect can of course also be achieved by tilting two or three propellers 4, 5, 6.

Figure 4:
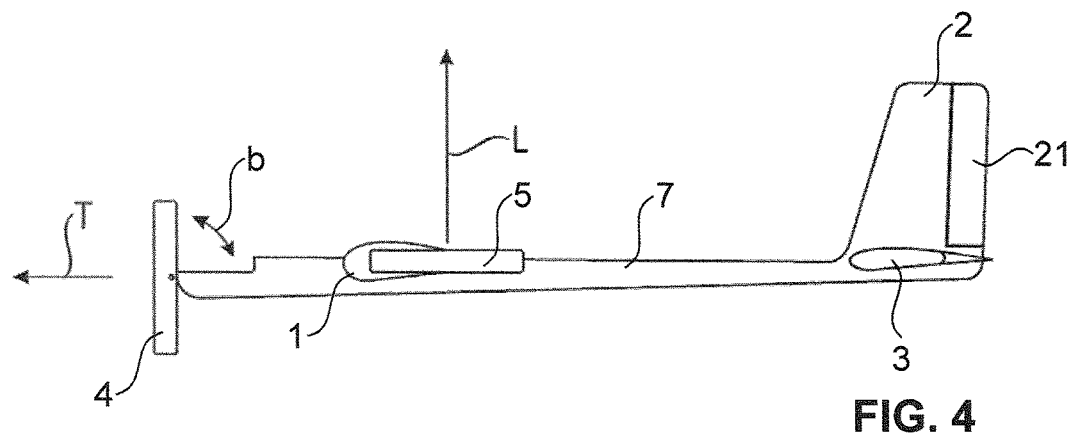
FIG. 4 shows a side view of an inventive flying apparatus according to a third embodiment.

FIG. 4 shows a further embodiment, which differs from the embodiments as shown in FIGS. 1 to 3 by having a front propeller 4 that can be tilted such that its thrust T is directed from a vertical direction to a horizontal direction along the longitudinal centre axis 10. In the horizontal direction, the thrust T of the front propeller 4 allows to increase the speed of the flying apparatus in the longitudinal direction. If the speed of the flying apparatus is high enough such that the aerodynamic lift forces L of the airfoil 1 can compensate the weight, the two propellers 5, 6 on the airfoil 1 can be turned off and the flying apparatus operates as a conventional propeller airplane with a propeller in the front. Such a configuration allows a continuous transition from the hover mode e.g. during taking-off and landing into the forward flight mode and back. In order to stabilize the flying apparatus during hover mode, the front propeller 4 may also be tiltable about the longitudinal centre axis 10 of the flying apparatus as depicted in FIG. 3.

Figure 5:
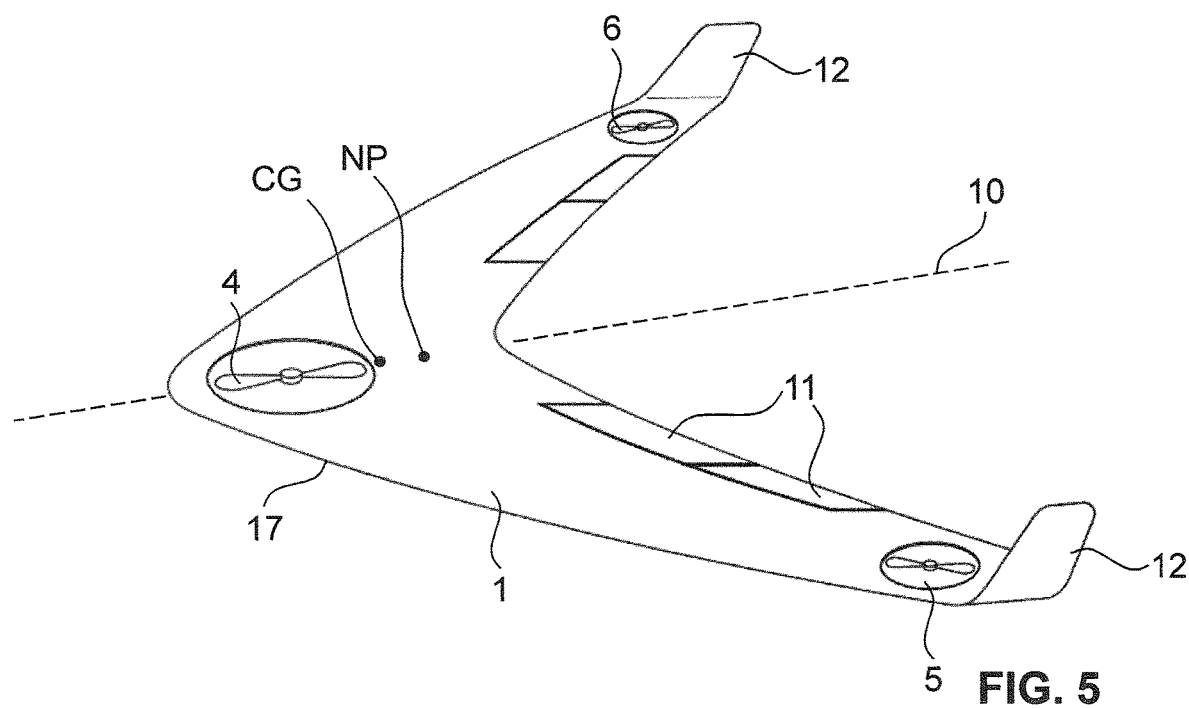
FIG. 5 shows a perspective view of an inventive flying apparatus according to a fourth embodiment.

FIG. 5 shows a further embodiment of a flying apparatus having in this case essentially the shape of a flying wing formed by airfoil 1. Control of the forward flying motion with respect to pitch, yaw and roll is obtained by ailerons 11 on the wing. Three propellers 4, 5 and 6 are integrated in the wing design and arranged symmetrically with respect to the longitudinal centre axis 10 of the flying apparatus. As in the previous embodiments, the centre of gravity CG of the flying apparatus needs to be in front of the aerodynamic or neutral centre NP along the longitudinal direction of the flying apparatus with respect to the air inflow direction, in order to achieve stable flight characteristics. The centre of thrust of the three propellers 4, 5, 6 has to be essentially at the centre of gravity CG of the flying apparatus. The front propeller 4 can also be rotated about the longitudinal centre axis 10 of the flying apparatus to control the hovering position of the flying apparatus as well as about a transverse axis to produce thrust in the forward flight direction. The two side propellers 5, 6 placed in the region of the wing tips may also be mounted such that they are tiltable about one or two axes. This allows for more thrust in the forward flight mode and for improved control in the hover mode. Winglets 12 are provided at each wing tip of the airfoil 1, in order to further improve the flight characteristics of the flying apparatus.

Figure 6:
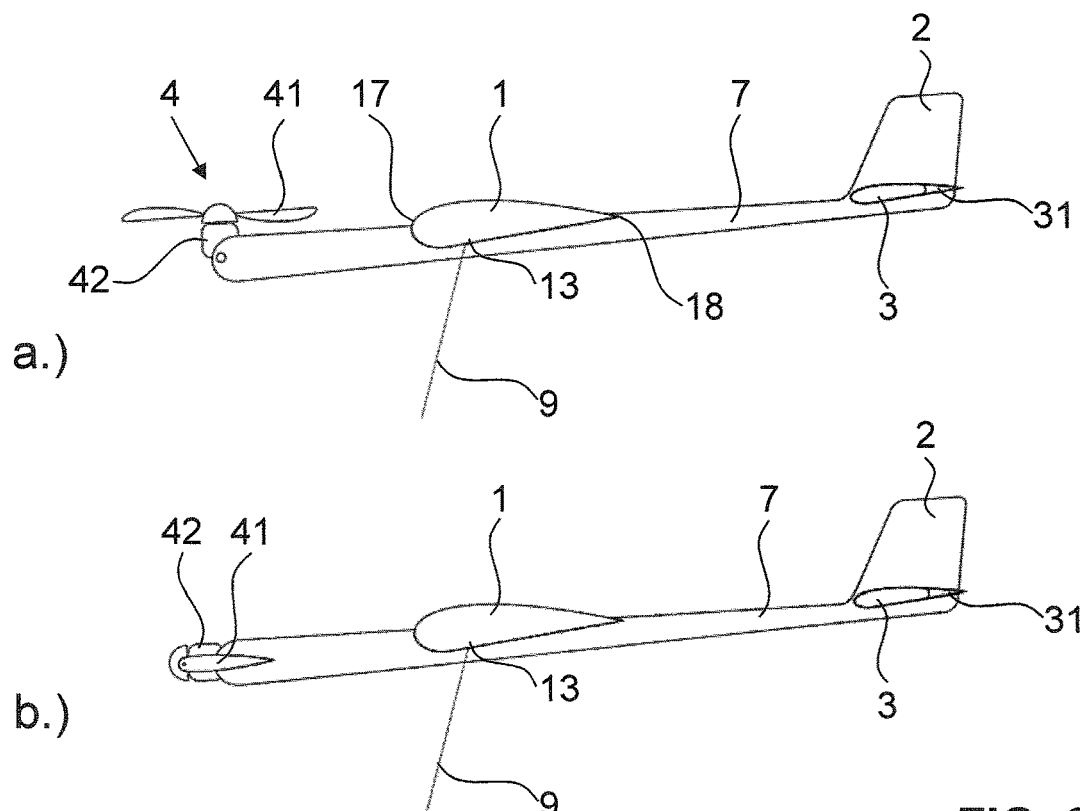
FIG. 6 shows a side view of an inventive flying apparatus according to a fifth embodiment, with the front propeller being a.) in an active position and b.) in an idle position.

FIG. 6 shows an embodiment of a flying apparatus used to generate electric energy, being connected to the ground by means of two tethers 9. Pivot points 13 are provided on the airfoil 1 to connect the tethers 9 to the flying apparatus. The front propeller 4 of this embodiment is rotatable about an axis extending in parallel to the span direction of the airfoil 1. During launching and landing, the front propeller 4 is oriented such, that its thrust T is directed essentially in the vertical direction to compensate the weight of the flying apparatus (figure a.)). For power production during the power and depower phase, the propeller 4 and its associated motor 42, when being in the position as shown in FIG. 6a.), would produce aerodynamic drag which lowers the aerodynamic efficiency of the flying apparatus. Therefore, during power production and particularly during crosswind flight, the front propeller 4 and its motor 42 may be turned into the forward position as shown in FIG. 6b.), and the propeller blades 41 may be folded backward into a streamlined position, in order to reduce the overall drag of the flying apparatus (FIG. 6b.)). Other solutions such as automatically stowing the motor 42 and the propeller blades 41 in the fuselage 7 under crosswind flight can also be employed.

Figure 7:
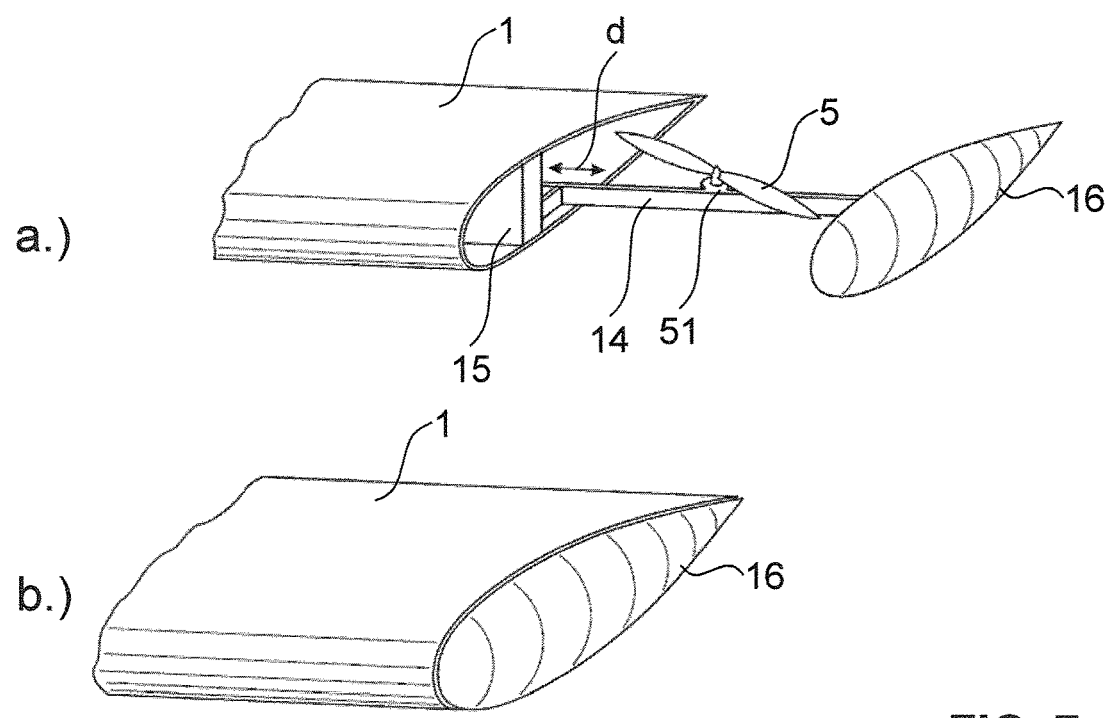
FIG. 7 shows a perspective partial view of the airfoil wing tip of an inventive flying apparatus according to a sixth embodiment, with the side propellers being a.) in an active position and b.) in an idle position.

In FIG. 7, an embodiment is shown with side propellers 5 and 6 that are retractable into the interior of the airfoil 1. During hovering, i.e. in the launching and landing phases, the propellers 5 and 6 are outside of the airfoil 1, in order to produce a vertical thrust T (FIG. 7a.)). During crosswind flight, however, the propellers 5 and 6 and their motors 51 and 61 are completely stowed in the interior of the airfoil 1, in order to reduce the drag of the flying apparatus (figure b.)). To this end, the motors 51, 61 are each mounted on a rail 14 that extends along the span direction of the airfoil 1 and that is attached to the main spar 15 of the airfoil 1 such that the rail 14 is slideable along the span direction of the airfoil 1. A side cover 16 is provided at the outer end of the rail 14 for covering the lateral outer end of the airfoil 1, when the propellers 5, 6 are in their retracted positions. Thus, in the position as shown in figure b.), the propellers 5, 6 and the motors 51, 61 do not affect the aerodynamic properties of the flying apparatus anymore.

Figure 8:
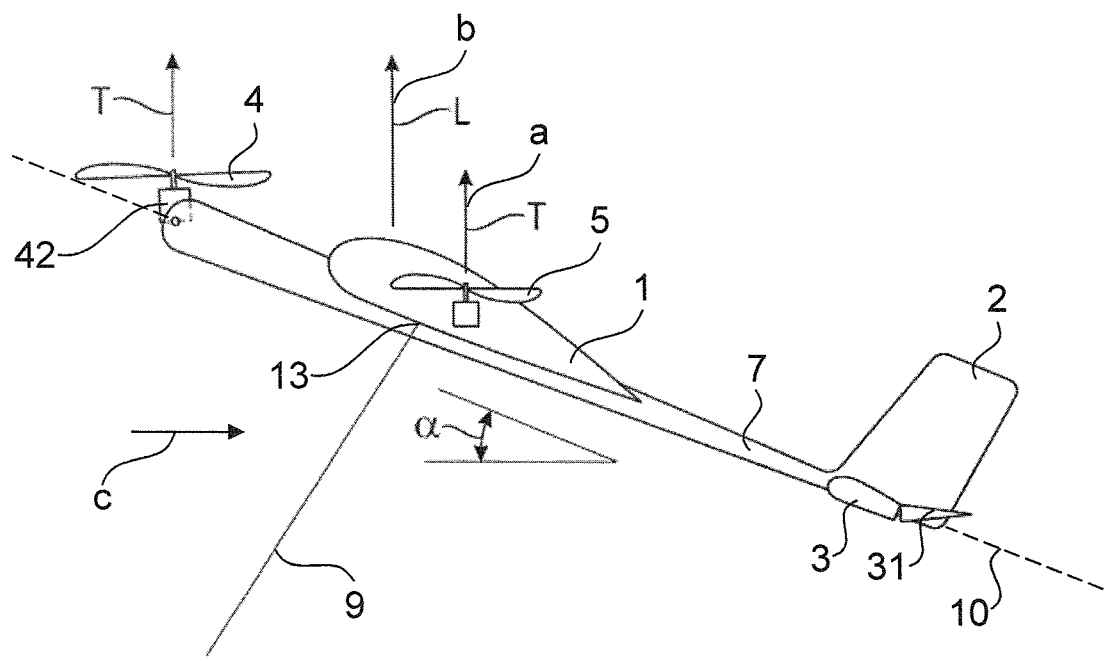
FIG. 8 shows a side view of an inventive flying apparatus according to a seventh embodiment, the flying apparatus being connected to a ground station by means of a tether.
Figure 9B:
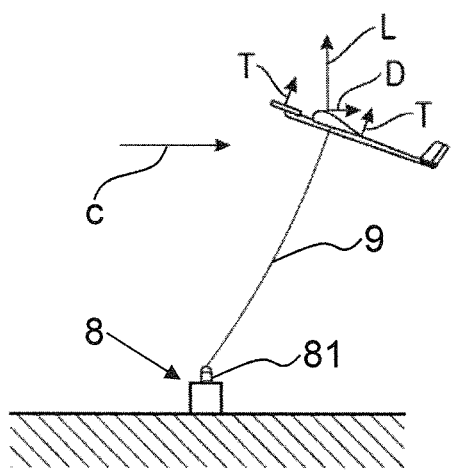
FIG. 9b shows a later part of the launching phase of a flying apparatus according to the invention, in a system for generating electrical energy.
Figure 9A:
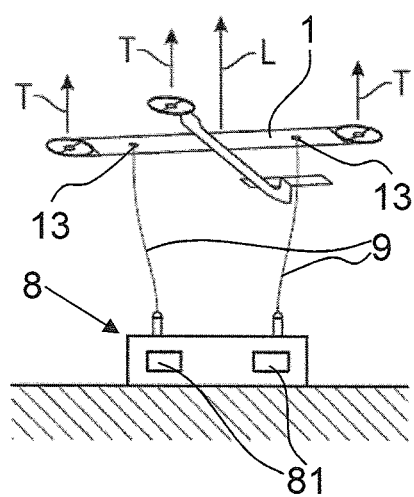
FIG. 9a shows the initial part of the launching phase of a flying apparatus according to the invention, in a system for generating electrical energy.
Figure 9C:
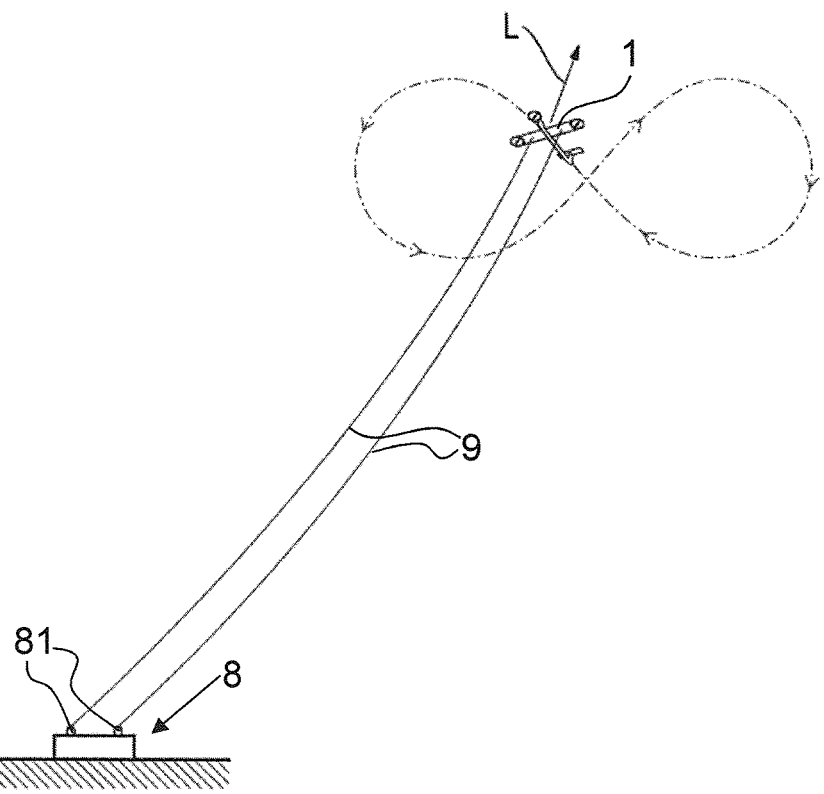
FIG. 9c shows the power phase of a flying apparatus according to the invention, in a system for generating electrical energy.

FIG. 8 shows an embodiment of a tethered flying apparatus used for generating electrical energy, with inclined orientation of all propellers 4, 5 and 6. In order to optimize the synergies between aerodynamic lift L and propeller thrust T, it can be favourable to mount the propellers 4, 5, 6 in a forwardly inclined orientation with respect to the chord line of the airfoil 1 and to the longitudinal centre axis 10, as shown in FIG. 7. The lift coefficient increases with the angle of attack α and reaches a maximum before the airfoil 1 stalls. Depending on the design and the profile of the airfoil 1, high lift coefficients are obtained typically for an α between 10° and 20°.

As soon as there is an apparent airflow with respect to the flying apparatus, such as it is the case under wind with a tethered flying apparatus, the control of the flying apparatus can be supported or taken over by the aerodynamic control surfaces. The pitch angle can be controlled by the elevators 31 instead of the inclined or differential thrust of the front and side propellers 4, 5, 6. The yaw can be stabilized with a vertical stabilizer 2 which can be augmented with a side rudder 21. The roll can be controlled by ailerons 11 or in a configuration with more than one tether with differential steering of the tethers.

FIGS. 9a to 9c show a system for generating electrical energy comprising a flying apparatus according to one of the presented embodiments. The system comprises a ground station 8 with two winches 81, which are connected to the flying apparatus by means of tethers 9.

The launching phase is shown in FIG. 9a. In this phase, the flying apparatus is hovering by means of the thrust of the propellers 4, 5, 6. Typically, for the application to harness wind energy, the flying apparatus will only be launched when there is at least some minimal amount of wind. Thus, the thrust T of the propellers 4, 5, 6 is supported by some aerodynamic lift force L, which reduces the needed power of the motors 42, 51 and 61. While the flying apparatus gains height, the tethers 9 are slowly reeled out from the winches 81.

FIG. 9b shows a later part of the launching phase, after the flying apparatus has gained some height. Due to the wind, the flying apparatus also experiences drag forces D. Due to these drag forces D, the flying apparatus not only gains height but is also pushed downwind to some extent, and thus the distance of the flying apparatus from the ground station 8 is increased both in the vertical and the horizontal direction. Once a minimal altitude is reached, the flying apparatus can be brought into crosswind motion, in order to start the power phase. The transition from hover into crosswind motion can e.g. be facilitated by reeling in the tethers 9 at high speed for a short period of time. In doing so, the flying apparatus is accelerated into the cross wind motion.

FIG. 9c shows the crosswind flight of the flying apparatus during the power phase. The motors 42, 51, 61 are turned off and electrical power is produced at the ground station 8 solely due to the aerodynamic forces. The kitepower system of FIG. 9 has two tethers 9, which allows a roll motion and thus a turning flight of the flying apparatus to be enforced by adjusting the differential length of the two tethers 9 in the ground station 8. In a two-line configuration, the flying apparatus typically follows a figure eight pattern during crosswind flight. The motion of the flying apparatus can this way be controlled from the ground making the system simple and robust.

When the flying apparatus has reached its ultimate altitude, the crosswind motion is stopped and the flying apparatus is depowered and flown towards the groundstation 8 to its minimal altitude. Some energy needs to be invested to reel in the tethers 9 in this process, which, however, is a small fraction of the produced energy of the power phase. Once the minimal altitude is reached, the crosswind motion and the power phase start again. In order to improve the cycle efficiency, the provision of at least one active elevator 31 for pitch control is beneficial. In particular during the depower phase the flying apparatus is flown with a low lift coefficient. The propellers 4, 5, 6 might also be activated during the depower phase to improve control over the flying apparatus.

It goes without saying that a single tether kite power concept can also be accomplished with the flying apparatus of the present invention. In this case, roll can e.g. be controlled by the ailerons 11. Three tethers or more can also be applied. In such a setting, the pitch can be controlled from the ground by means of the tethers, too.

Communication between the flying apparatus and the ground station 8 for control of the aerodynamic surfaces 11, 21, 31 and motors 42, 51, 61 can be achieved by means of a radio communication system or by means of a conducting tether 9. Power supply of the active systems of the flying apparatus can be achieved with an on-board battery system or through a conducting tether 9 from the ground. The on-board batteries can e.g. be charged during flight through a small on-board wind turbine or by using at least one of the motors 42, 51, 61 as a generator. However, power is usually mostly consumed by the motors 42, 51, 61 driving the propellers 4, 5, 6 to generate thrust T. As this is only needed during the short launching and landing phases, the overall energy consumption is relatively small. Thus, the batteries might also be recharged during phases of low wind when the flying apparatus is perched on the ground.

FIG. 10 shows a further application for the flying apparatus according to the invention. Here, the flying apparatus, which can be designed according to any of the embodiments as shown in FIGS. 1 to 9, is used as a stationary elevated platform system e.g. for areal observation or signal transduction as it might be used in telecommunication. When being used as a flying antenna for telecommunication purposes, the flying apparatus can be adapted to transduce signals being received from and sent to signal stations 83, such as mobile phones. The flying apparatus is connected to the ground by means of a tether 9. As in the embodiments of FIGS. 6, 8 and 9a to 9c, the tether(s) 9 is/are preferably connected to the flying apparatus along the longitudinal direction essentially at the centre of gravity CG. In no wind conditions, the flying apparatus is hovering at the specified altitude through the thrust T of the propellers 4, 5, 6. If there is wind, the airfoil 1 generates aerodynamic lift L similar as in a kite and the power of the motors 42, 51, 61 driving the propellers 4, 5, 6 can be reduced or turned off. If the flying apparatus needs to be positioned at exact the same location under all wind conditions, the front propeller 4 or the two side propellers 5, 6, can be tilted towards the front, such a forward thrust T is generated which counterbalances the drag of the flying apparatus due to the apparent wind. Tilting all three propellers 4, 5 and 6 into the forward direction also produces the same effect. In low wind conditions, the tethered flying apparatus might also fly in horizontal circles driven by the tilted propellers to generate an apparent wind and thus aerodynamic lift forces.

For launching, the flying apparatus according to FIG. 10 does hover and gains altitude while the tether 9 is reeled out from the winch 81 of the ground station 8. For landing, the tether 9 is reeled in and the flying apparatus lowered. For long missions, a conducting tether 9 is ideally used bringing power and control signals from the ground to the flying apparatus. The control signals can also be transmitted wirelessly, e.g. by means of radio transmission. With a constant power supply e.g. by means of connected photovoltaic panels 82, the stationary elevated platform can operate continuously over years. For short missions, a solution with a battery system on-board the flying apparatus might be more convenient. For not too large payload, the system can be easily transported on a trailer and can be deployed in a very short time on the site. Overall, the system is very much simpler to deploy and handle than e.g. a tethered blimp where position control under wind conditions is hard to achieve.

Figure 11:
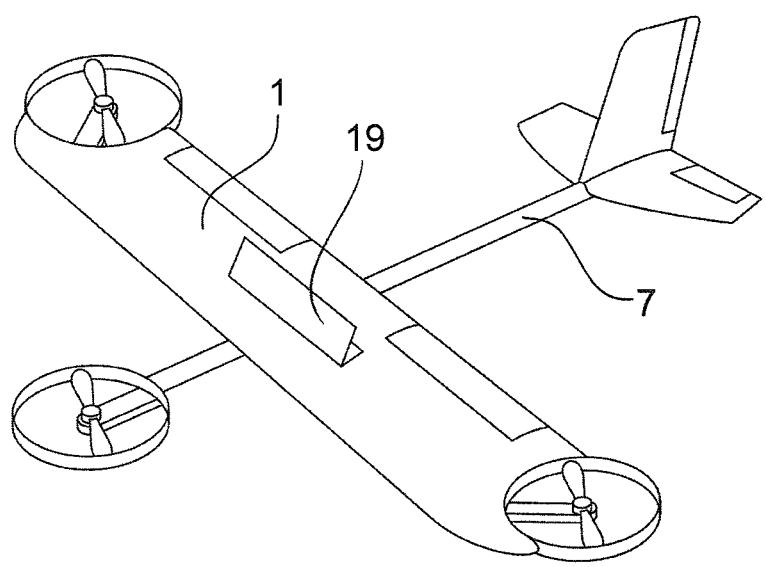
FIG. 11 shows a perspective view of an inventive flying apparatus according to an eighth embodiment, the flying apparatus comprising an air brake.

FIG. 11 shows a further embodiment of a flying apparatus according to the invention. The flying apparatus of this embodiment comprises an air brake 19 which is here integrated into the airfoil 1. The function of the air brake 19 is to reduce the aerodynamic lift of the wing and to increase the aerodynamic drag when being activated as in the situation shown in FIG. 11. Different concepts and arrangements of air brakes sometimes also known as spoilers are known to the skilled person. Balancing the aerodynamic lift with the thrust of the propellers 4, 5, 6 during launching and landing can be difficult under high winds and gusty winds in particular for a tethered configuration of the flying apparatus. Activation of the air brake 19 reduces the effect of wind and gusts on the lift of the flying apparatus. This enables an easier position control by means of the propellers 4, 5, 6 and improves the stability of the flying apparatus.

Different functional elements of the different embodiments are of course interchangeable between the embodiments. For example, the front propeller 4 as shown in FIGS. 3 and 4 can have foldable blades 41 as shown in the embodiment of FIG. 6. Furthermore, the invention is of course not limited to the presented embodiments and a plurality of modifications is possible.

The invention claimed is:

1. A flying apparatus with a longitudinal centre axis, the flying apparatus being adapted to generate electrical energy and comprising
    an airfoil extending essentially perpendicularly to the longitudinal centre axis along a span direction, comprising a streamlined profile with a leading edge and a trailing edge for generating an aerodynamic lift force vector acting on the flying apparatus when being exposed to an air flow;
    at least three drive units being adapted to generate a resulting thrust force vector acting on the flying apparatus, the thrust force vector being alignable essentially in parallel with the aerodynamic lift force vector;
    at least one control surface for controlling the aerodynamic pitch of the flying apparatus; and
    at least one pivot point for the connection of a tether, in order to connect the flying apparatus to a ground station;

wherein the flying apparatus has an aerodynamic neutral point that lies, along the longitudinal centre axis and in the direction from the leading edge to the trailing edge, behind the centre of gravity of the flying apparatus.

2. The flying apparatus as claimed in claim 1, wherein at least two drive units are integrated in the airfoil.

3. The flying apparatus as claimed in claim 1, wherein one or more drive units are arranged in the region of the trailing edge of the airfoil.

4. The flying apparatus as claimed in claim 1, wherein at least one drive unit is tiltable about a first rotation axis extending essentially in parallel to the longitudinal centre axis, in order to stabilize the flying apparatus during launching and landing.

5. The flying apparatus as claimed in claim 1, wherein at least one drive unit is tiltable about a second rotation axis extending essentially in parallel to the span direction of the airfoil, in order to change the thrust force vector of this respective drive unit from a vertical to a horizontal direction along the longitudinal centre axis of the flying apparatus.

6. The flying apparatus as claimed in claim 1, wherein the drive units are arranged such that the centre of the vertical thrust force vectors generated by the drive units is in the region of the centre of gravity of the flying apparatus.

7. The flying apparatus as claimed in claim 1, wherein at least two pivot points are provided, each of these pivot points serving for the connection of a tether, and wherein the pivot points are arranged such, that the flying apparatus can be rolled during tethered flight by means of differential operation of the tethers, in order to manoeuvre the flying apparatus through a turning flight.

8. The flying apparatus as claimed in claim 1, wherein the flying apparatus is adapted for flying crosswind.

9. The flying apparatus as claimed in claim 1, wherein at least one drive unit comprises a propeller with blades that are, in the idle state of the propeller, foldable into a streamlined position, in order to reduce the aerodynamic drag acting on the flying apparatus.

10. The flying apparatus as claimed in claim 1, wherein at least one drive unit is arranged, with respect to the direction from the leading edge to the trailing edge and along the longitudinal centre axis, in front of the airfoil.

11. The flying apparatus as claimed in claim 10, wherein the at least one drive unit is arranged on the longitudinal centre axis of the flying apparatus.

12. The flying apparatus as claimed in claim 1, wherein a drive unit is arranged in the region of each wing tip of the airfoil.

13. The flying apparatus as claimed in claim 12, wherein the drive units arranged in the regions of the wing tips are retractable into the interior of the airfoil.

14. The flying apparatus as claimed in claim 1, wherein at least one pivot point is arranged, in the direction of the longitudinal centre axis, essentially at the centre of gravity of the flying apparatus.

15. The flying apparatus as claimed in claim 14, wherein all pivot points are arranged, in the direction of the longitudinal centre axis, essentially at the centre of gravity of the flying apparatus.

16. The flying apparatus as claimed in claim 1, wherein the flying apparatus additionally comprises an air brake for reducing the aerodynamic lift of the flying apparatus.

17. The flying apparatus as claimed in claim 16, wherein the air brake is integrated into the airfoil.

* * * * *